(12) United States Patent
Mitchell

(10) Patent No.: US 9,751,574 B1
(45) Date of Patent: Sep. 5, 2017

(54) AUTOMATED HOIST FOR A VEHICLE SPARE TIRE

(71) Applicant: Chance Mitchell, Burleson, TX (US)

(72) Inventor: Chance Mitchell, Burleson, TX (US)

( * ) Notice: Subject to any disclaimer, the term of this patent is extended or adjusted under 35 U.S.C. 154(b) by 0 days.

(21) Appl. No.: 14/793,853

(22) Filed: Jul. 8, 2015

Related U.S. Application Data

(60) Provisional application No. 62/023,832, filed on Jul. 12, 2014.

(51) Int. Cl.
*B62D 43/00* (2006.01)
*B62D 43/04* (2006.01)
*B66D 3/18* (2006.01)

(52) U.S. Cl.
CPC ......... *B62D 43/002* (2013.01); *B62D 43/045* (2013.01); *B66D 3/18* (2013.01)

(58) Field of Classification Search
CPC .... B62D 43/045; B62D 43/002; B62D 43/04; B62D 43/10; B66C 1/54
USPC ........ 212/122, 312; 224/42.23; 294/195, 90, 294/93; 296/37.2; 414/251, 463–466, 414/626, 910
See application file for complete search history.

(56) References Cited

U.S. PATENT DOCUMENTS

| | | | |
|---|---|---|---|
| 2,034,834 A * | 3/1936 | Robinson, Jr. | B62D 43/002 224/42.23 |
| 2,325,848 A * | 8/1943 | Gildea | B62D 43/045 414/463 |
| 2,354,944 A * | 8/1944 | Clark | B62D 43/002 280/767 |
| 2,547,083 A * | 4/1951 | Lundgren | B62D 43/10 224/496 |
| 2,617,548 A * | 11/1952 | Falkner | B66C 1/54 212/250 |
| 2,789,859 A * | 4/1957 | Woellner | B66C 1/54 294/90 |
| 2,844,263 A * | 7/1958 | Dreyer | B65G 59/08 212/332 |
| 3,539,152 A * | 11/1970 | Paul | B62D 43/045 224/42.23 |
| 3,554,415 A * | 1/1971 | Woods | B62D 43/04 224/42.21 |
| 3,734,325 A * | 5/1973 | Stone | B66C 1/0212 294/183 |
| 4,676,415 A * | 6/1987 | Kennedy | B62D 43/04 224/42.21 |
| 4,838,595 A * | 6/1989 | Spillar | B66C 1/66 294/90 |

(Continued)

FOREIGN PATENT DOCUMENTS

FR     EP 0477095 A1 *  3/1992  ........... B62D 43/002

*Primary Examiner* — Gregory Adams
(74) *Attorney, Agent, or Firm* — Kenneth L Tolar

(57) ABSTRACT

An automated hoist for a vehicle spare tire includes a linear bracket mounted beneath the vehicle chassis, proximal the rear bumper. A motorized housing can be automatically propelled backward or forward along the bracket. A retractable cable extending from the housing has a lifting plate at a distal end that is connected to the spare tire. When a driver engages a switch, the cable partially lowers the spare tire and the housing moves toward the rear of the vehicle. The cable is then completely lowered until the tire is at ground level and the lifting-plate automatically releases the tire.

2 Claims, 2 Drawing Sheets

(56) References Cited

U.S. PATENT DOCUMENTS

| | | | | |
|---|---|---|---|---|
| 4,884,785 | A * | 12/1989 | Denman | B62D 43/045 224/42.23 |
| 5,060,912 | A * | 10/1991 | Guarr | B62D 43/045 254/266 |
| 5,064,079 | A * | 11/1991 | Bowerman | B66C 19/02 212/175 |
| 5,074,423 | A * | 12/1991 | Smith | B66C 9/14 212/337 |
| 5,429,253 | A * | 7/1995 | McNett | B60P 1/5442 212/180 |
| 5,860,786 | A * | 1/1999 | Aubrecht | B62D 43/045 224/42.21 |
| 6,010,171 | A * | 1/2000 | Margiottiello | B66C 1/54 294/86.25 |
| 6,406,000 | B1 * | 6/2002 | Raz | B62D 43/045 224/42.23 |
| 6,808,360 | B1 * | 10/2004 | Patterson | B66C 1/66 294/89 |
| 6,991,417 | B2 * | 1/2006 | Reznar | B62D 43/045 254/323 |
| 7,556,470 | B2 * | 7/2009 | Lawson | B29D 30/0016 157/1.17 |
| 7,708,514 | B2 * | 5/2010 | Benedict | B63B 25/004 104/98 |
| 7,775,384 | B2 * | 8/2010 | Zaguroli, Jr. | B66C 9/14 212/328 |
| 7,950,893 | B2 * | 5/2011 | Rican | B66F 9/185 294/90 |
| 8,128,336 | B2 * | 3/2012 | Kramp | G11B 17/028 294/100 |
| 2009/0295179 | A1 * | 12/2009 | Michaels | B29D 30/0603 294/97 |
| 2011/0180507 | A1 * | 7/2011 | Givens | B66C 5/02 212/312 |

* cited by examiner

AUTOMATED HOIST FOR A VEHICLE SPARE TIRE

CROSS REFERENCE TO RELATED APPLICATIONS

This application is entitled to the benefit of provisional patent application No. 62/023,832 filed on Jul. 12, 2014, the specification of which is incorporated herein by reference.

BACKGROUND OF THE INVENTION

The present invention relates to an automated hoist for a vehicle spare tire.

DESCRIPTION OF THE PRIOR ART

Many larger vehicles, such as SUVs and pickup trucks, have spare tires mounted underneath the chassis. To access the tire, a driver must manually rotate a crank to gradually lower the spare tire to ground level. The driver must then crawl beneath the vehicle to release the tire from a lifting cable, which is laborious and burdensome, particularly in inclement weather. Accordingly, there is currently a need for a device that allows a driver to more easily access a spare tire. The present invention addresses this need by providing an automated hoist that automatically lowers and deploys a spare tire.

SUMMARY OF THE INVENTION

The present invention relates to an automated hoist for a vehicle spare tire comprising a linear bracket mounted beneath the vehicle chassis, proximal the rear bumper. A motorized housing can be automatically propelled backward or forward along the bracket. A retractable cable extending from the housing has a lifting plate at a distal end that is connected to the spare tire. When a driver engages a switch, the cable partially lowers the spare tire and the housing moves toward the rear of the vehicle. The cable is then completely lowered until the tire is at ground level and the lifting-plate releases the tire.

It is therefore an object of the present invention to provide an automated hoist for a vehicle spare tire.

It is another object of the present invention to provide a motorized hoist for a vehicle that automatically lowers and deploys a spare tire.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
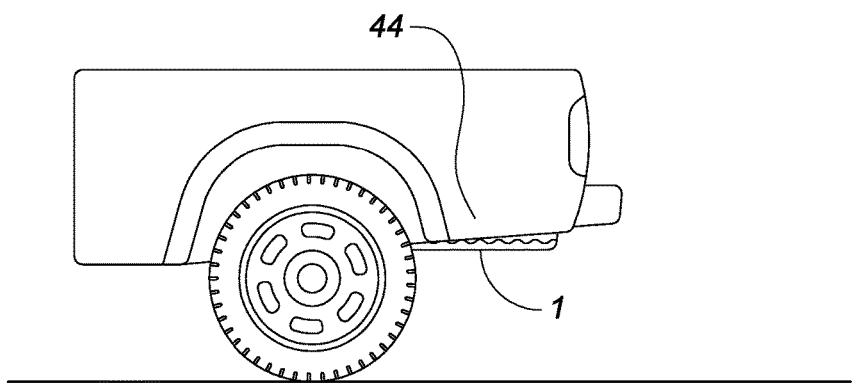
FIG. 1 depicts a vehicle having a spare tire mounted beneath the chassis.
Figure 2:
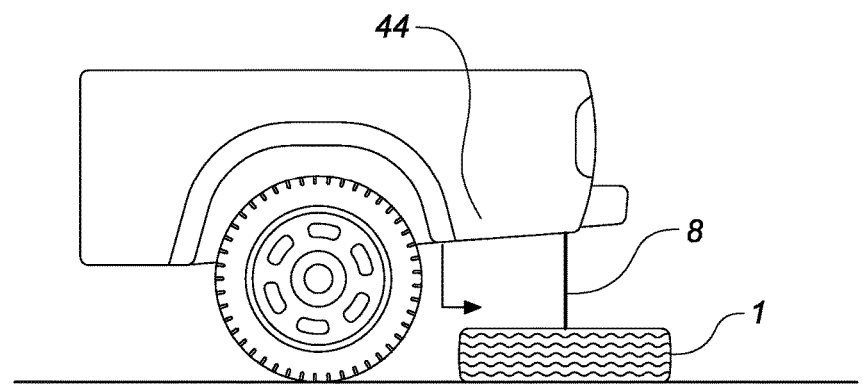
FIG. 2 depicts the vehicle of FIG. 1 with the spare tire lowered and deployed by the hoist according to the present invention.
Figure 3:
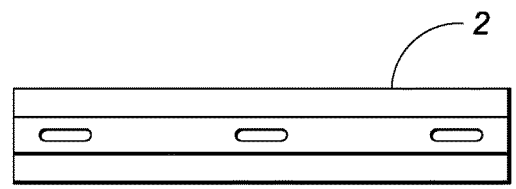
FIG. 3 is an isolated view of the mounting bracket.
Figure 4:
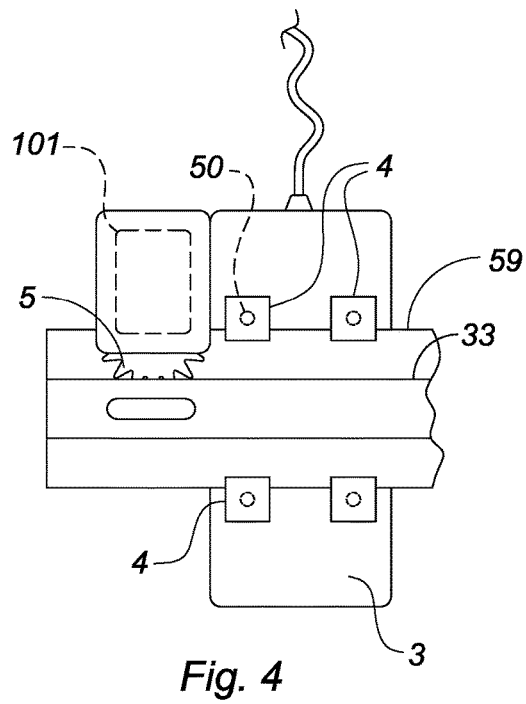
FIG. 4 is an isolated, top view of the housing and lifting plate.
Figure 5:
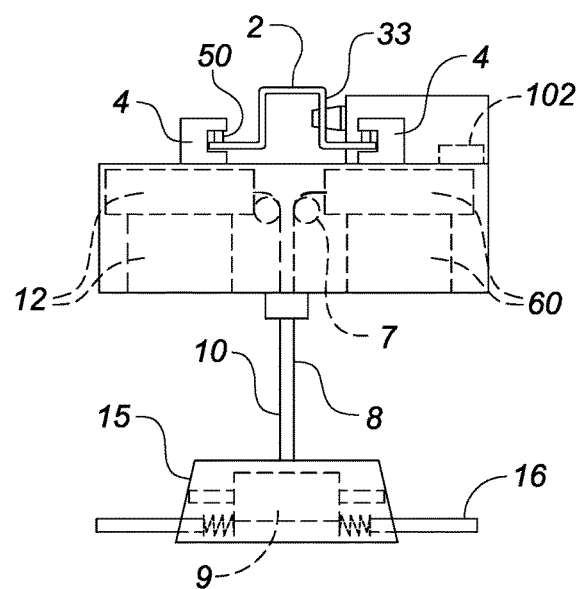
FIG. 5 is an isolated, end view of the housing and lifting plate.
Figure 7:
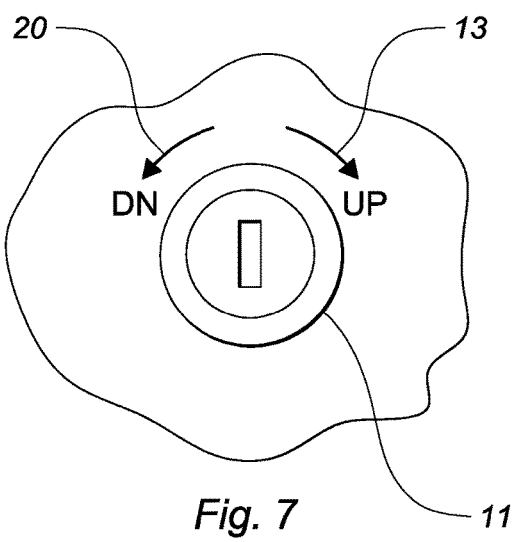
FIG. 7 is an isolated view of the keyed switch.
Figure 6:
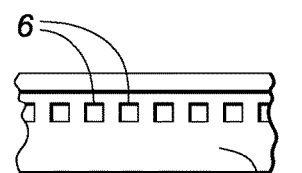
FIG. 6 is a sectional view of the mounting bracket, depicting the apertured sidewall for engaging the motorized gear.

The present invention relates to an automated hoist for a vehicle spare tire 1 comprising a linear bracket 2 mounted beneath the vehicle chassis 44, proximal the rear bumper. Slidably mounted on the bracket is a housing 3 having two opposing pairs of supports 4 that each grip one of two side edges 59. A wheel 50 within each support minimizes friction and prevents the housing from twisting during movement. Attached to the housing is a motorized gear 5 that engages a series of apertures 6 longitudinally positioned along a raised sidewall 33 on the bracket. Accordingly, operation of the motor 101 axially translates the housing forward or backward along the bracket.

Within the housing interior is a spool 7 having a lifting cable 8 spirally wrapped thereabout. A motor 60 rotates the spool to extend and retract the cable as directed by a microcontroller 102. At a distal end of the cable is a lifting plate 15 with a pair of spring-biased arms 16 extending outwardly therefrom. A solenoid 9 within the lifting plate interior automatically retracts the arms upon receiving a predetermined command from the microcontroller 102. A linear spring motor 12 allows the solenoid's power cable 10 to extend and retract as the lifting cable is raised and lowered.

Accordingly, to deploy a spare tire, a driver moves a key-operated switch 11 to a "DOWN" position 20. The cable motor partially lowers the tire and the motorized gear moves the housing toward the rear of the vehicle. The cable motor then completely lowers the tire to ground level and the lifting-plate solenoid retracts the arms to release the tire. The spare tire is stored by inserting the lifting plate into the central core of the tire rim and moving the switch to an "UP" position 13. The microcontroller then instructs the solenoid to release the spring-biased arms, which automatically deploy beneath the tire. The motor reverses the housing and raises the lifting plate to its original, stowed position.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An automated hoist for a vehicle spare tire comprising:
a linear bracket mounted beneath a vehicle chassis;
a housing slidably mounted on said bracket;
a cable depending from said housing, said cable having a distal end attached to a spare tire;
means for extending and retracting said cable,
means for releasing said tire from said cable wherein said means for releasing said tire from said cable includes a lifting plate at a distal end of said cable, said lifting plate having a pair of spring-biased arms extending outwardly therefrom, beneath said spare tire; a solenoid received within said lifting plate and connected to said arms; and a controller means for commanding said solenoid to retract said arms;

means for moving said housing along said bracket, wherein said means for moving said housing along said bracket includes a series of apertures longitudinally positioned along said bracket; a gear attached to said housing and engaging at least one of said apertures; and a motor connected to said gear for rotating said gear in either of two directions whereby a user can lower the spare tire, move said spare tire toward the rear end of the chassis and release said tire from said cable to facilitate changing a flat tire.

2. The automated hoist according to claim 1 wherein said housing further comprises:

two opposing pairs of supports that each grip one of two side edges of said bracket;

a wheel within each of said supports for minimizing friction and for preventing said housing from twisting during movement.

* * * * *